March 9, 1954 R. S. ROBINS 2,671,392
CAMERA SUPPORT
Filed Feb. 28, 1951
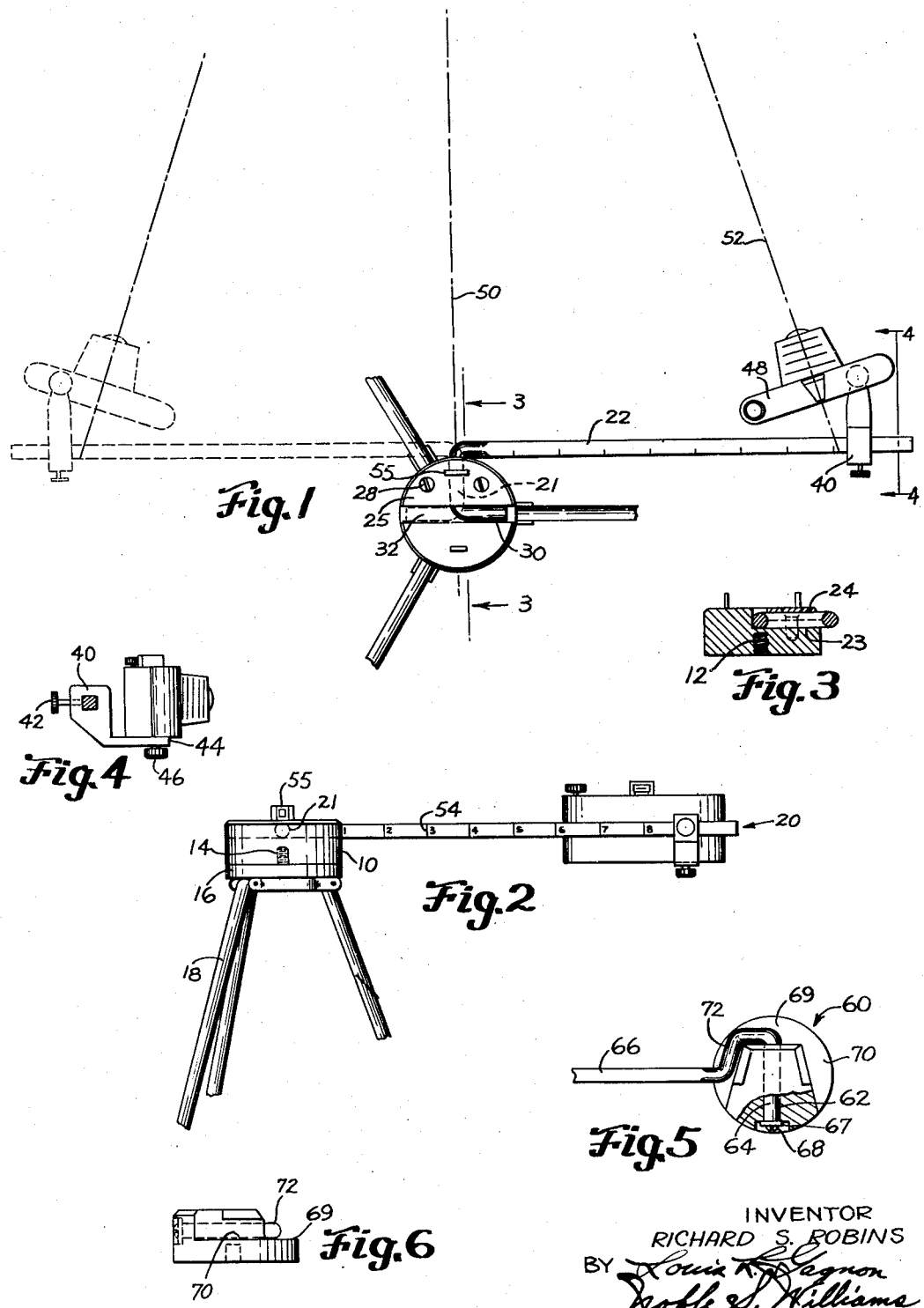
INVENTOR
RICHARD S. ROBINS
BY
ATTORNEYS Patented Mar. 9, 1954

2,671,392

UNITED STATES PATENT OFFICE 2,671,392

CAMERA SUPPORT

Richard S. Robins, Stamford, Conn., assignor to American Optical Company, Southbridge, Mass., a voluntary association of Massachusetts Application February 28, 1951, Serial No. 213,229

5 Claims. (Cl. 95—86)

This invention relates to photographic equipment and more particularly to a simple, efficient and inexpensive device for enabling a person to take stereoscopic pictures in pairs using only one camera of substantially any conventional construction.

It is well-known that a pair of photographic pictures of the same view or objects may be taken with a pair of cameras positioned at slightly spaced locations and employed in a stereoscopic viewer or the like for producing scenes having three-dimensional effects. Such pictures are generally obtained by the use of a pair of cameras operating simultaneously and with both cameras having their optical axes directed substantially at the same central point of interest in the scene or view being photographed. This technique, however, has one serious objection, such being the necessity and expense of a second camera. If, however, no appreciable change in a scene or view would ordinarily occur during the short interval of time required for taking a photograph, it is possible to employ a single camera, instead of a pair of cameras, and to take a picture of the scene while in a preferred location and then to move the camera laterally a proper amount and to take a second picture thereof. Care must be exercised, however, that the proper adjustment of the camera in its second position is made relative to its first position in order to assure acceptable results. When this is done, satisfactory stereoscopic pictures may be made even though only a single camera is available for use.

The present invention provides a simple, efficient and inexpensive device which may be used with any conventional camera and tripod or the like for enabling one to easily take stereoscopic pictures using merely a single camera, and by making exposures with the camera in two opposite positions of adjustment of said device.

It is, accordingly, an object of the present invention to provide for use with a single camera a simple, efficient and inexpensive device of the character described for accurately supporting the camera successively in two co-related picture-taking positions so that a pair of stereoscopic photographic exposures may be readily and successively made at laterally spaced positions, without other adjustments being necessary.

Other objects and advantages of the invention will become apparent from the detailed description which follows when taken in conjunction with the accompanying drawing, in which:

Fig. 1 is a plan view of applicant's camera supporting device and structure associated therewith for taking stereoscopic pictures;

Fig. 2 is an elevational view of the device of Fig. 1;

Fig. 3 is a sectional view taken substantially on line 3—3 of Fig. 1;

Fig. 4 is a sectional view taken substantially on line 4—4 of Fig. 1;

Fig. 5 is a plan view of a slightly modified form of the invention; and

Fig. 6 is a side elevational view of the structure of Fig. 5.

Referring to the drawing in detail, it will be seen in Figs. 1, 2 and 3 that a preferred form of the stereoscopic camera support of the invention may comprise a circular supporting base 10 which may be provided with a central screw-threaded opening 12 in a bottom portion thereof for attachment to an upstanding bolt 14 on the head 16 of a conventional tripod 18. In this way, the base may be supported and securely maintained in a preferred fixed position during use of the device. The supporting base has formed therein or thereon, in any suitable manner, hinge means for enabling a camera-carrying arm 20 to be pivotally attached to said base. In the construction shown in Fig. 1, this hinge means may comprise a cylindrical end portion 21 of the camera-supporting arm 20 which portion is bent substantially at right angles to the elongated main body portion 22 of said arm. The portion 21 is rotatably retained in place by a substantially semicircular recess 23 formed in said base and a complementary recess 24 formed in a partially circular cover plate 25. This cover plate, in turn, may be bolted, or otherwise secured, in place upon the supporting base 10, as by screw-threaded bolts 28 or the like.

The extreme inner end 30 of this hinged camera-carrying arm 20 is angularly bent relative to the cylindrical hinge portion 21 thereof so as to be substantially parallel to the main body portion 22 thereof. Thus, it may serve as a positive stop for limiting pivotal movement of the arm 20 when seated within a transversely extending groove or recess 32 in said base. The laterally extending recess 32, as is clear from inspection of Fig. 1, will accommodate this extreme end portion 30 and engagement between the bottom of the recess and end portion 30 may be utilized to limit downward pivotal movement of arm 20 in either operative position thereof when disposed laterally at either side of said base. Thus, it will be seen that upward pivotal movement of said arm 20 relative to said base will allow said arm to swing from one side to an opposite side of said base, through an angle of approximately 180°.

Upon the laterally extending main body portion 22 of arm 20 may be secured, preferably by a slidably adjustable connection, a camera-supporting bracket 40 which, in accordance with the amount of stereoscopic effect desired in a pair of pictures, may be adjusted laterally and locked in desired position by a set screw or the like 42. This bracket 40 in turn is provided with a forwardly extending foot 44 carrying an attaching screw 46 arranged to operatively engage and clamp a camera 48 of conventional construction in any preferred angular position relative to the longitudinal axis 50 of the hinge means for arm 20. In this way, the camera may be "toed in" any desired amount depending upon the distance between the hinge means 21 and the camera and the distance to the object to be photographed. It will be apparent that, for proper stereoscopic conditions of the supporting device, the optical axis 52 of the camera and the longitudinal axis 50 for the pivotally mounted carrying arm should normally intersect substantially at the principal point of interest in the view or scene being photographed. When the arm and camera are swung upwardly and over through an angle of approximately 180° after making a first exposure, they will occupy the dotted line position indicated in Fig. 1, and at such time the optical axis 52 of the camera will likewise pass through said principal point.

If desired, the carrying arm may be provided with graduations, as indicated at 54, so that a more convenient operation of the device for various stereoscopic photographing conditions may be had. The amount of lateral displacement employed for bracket 40 will, of course, control how strongly or weakly the stereoscopic effect will be manifest in the resulting pairs of pictures. Sighting means 55 of known type may be employed upon the supporting base 10 as shown and, if desired, for aligning axis 50 with said principal point. While the second exposure upon a strip of photographic film resulting from this procedure will be upside down with reference to the first, such is not of material consequence since in the use of most stereoscopic viewers, individual companion pictures are mounted upon a single carrying card or the like (not shown) and at such time, the second picture, of course, would be inverted and mounted in proper laterally spaced relation relative to the other.

In Figs. 5 and 6 is shown a slightly modified form of the invention. In this construction a base portion 60 is provided with a central horizontally extending bore 62 for receiving the cylindrical inner end portion 64 of a camera-carrying arm 66. Adjacent one end of bore 62 is provided an enlarged recess 67 for accommodating securing means 68 for retaining the end portion 64 in the bore 62 so that this part may be rotated through approximately 180° from a position wherein the main body portion of the arm 66 extends laterally to one side of supporting base 60 to a similar position at the opposite side thereof. To allow this swinging movement, the supporting base 60 has been cut-away along a front edge 69 and along parts of opposite sides as at 70 to form shelf portions, so that a bent portion 72 of said camera-carrying arm 66 may engage with these shelf portions and be held against further downward movement thereof.

While the word "longitudinal" has been used in several places throughout the description for convenience in referring to the general direction of the axis 50 and the general line of sight of the device, and the word "lateral" has been used to designate the relative position of the elongated camera supporting arm and such words quite accurately describe the device during its ordinary use, it should be clearly understood that such words are intended to express the general relationship of the parts of the device and their position during use relative to each other and are not to be interpreted as limiting the use of the device. Obviously, it may be used advantageously while the camera is taking stereoscopic pictures in any general direction.

Having described my invention, I claim:

1. A camera supporting device for stereoscopic photography, said supporting device comprising a relatively fixed base, an elongated movable arm, means hingedly securing one end portion of said arm to said base for upward pivotal movement about a longitudinally disposed axis, abutment means carried by said base and disposed in such positions relative to said arm and said hinge means as to support the opposite free end portion of said arm in substantially laterally extending positions at either side of said base and substantially 180° apart, said abutment means normally preventing movement of said arm when at either side of said base downwardly beyond either of said laterally extending positions, bracket means carried by said arm at a location spaced an appreciable amount from the hinged end portion thereof, and attachable camera supporting means carried by said bracket means so as to support a camera with its optical axis disposed at an acute angle relative to said longitudinally disposed axis when in operative positions at either side of said base, the construction and arrangement of the device being such that said optical axis in both operative positions of said camera and said longitudinally disposed axis jointly lying substantially in a common plane, whereby a pair of photographic exposures having stereoscopic properties may be obtained with said camera mounted on said device by merely making an exposure while the camera is in one of said operative positions and making a second exposure after said arm and camera have been moved to the other of said operative positions.

2. A camera supporting device for stereoscopic photography, said supporting device comprising a relatively fixed base, an elongated movable arm, means hingedly securing one end portion of said arm to said base for upward pivotal movement about a longitudinally disposed axis, abutment means carried by said base and disposed in such positions relative to said arm and said hinge means as to support the opposite free end portion of said arm in a substantially laterally extending position at either side of said base, said abutment means normally preventing movement of said arm when at either side of said base downwardly beyond either of said laterally extending positions, and bracket means carried by said arm and constructed and arranged to support a camera with its optical axis disposed at an angle relative to said longitudinally disposed axis when in operative positions at either side of said base, said bracket means being adjustable into any one of a plurality of operative positions on said arm laterally spaced from said longitudinally disposed axis, said optical axis in both operative positions of said camera and said longitudinally disposed axis jointly lying substantially in a common plane, whereby a pair of photographic exposures having stereoscopic properties may be obtained with said camera mounted on said device by merely making an exposure while the camera is in one of said operative positions and making a second exposure after said arm and camera have been moved to the other of said operative positions.

3. A camera supporting device for stereoscopic photography, said supporting device comprising a relatively fixed base, an elongated movable arm, means hingedly securing one end portion of said arm to said base for upward pivotal movement about a longitudinally disposed axis, abutment means carried by said base and disposed in such positions relative to said arm and said hinge means as to support the opposite free end portion of said arm in a substantially laterally extending position at either side of said base, said abutment means normally preventing movement of said arm when at either side of said base downwardly beyond either of said laterally extending positions, and bracket means carried by said arm and having a forwardly extending projection thereon, attachment means in said projection constructed and arranged to adjustably secure a camera to the projection with its optical axis disposed at any desired small angle relative to said longitudinally disposed axis when in operative positions at either side of said base, said bracket means being adjustable into any one of a plurality of operative positions on said arm laterally spaced from said longitudinally disposed axis, said optical axis in both operative positions of said camera and said longitudinally disposed axis each lying substantially in a common plane, whereby a pair of photographic exposures having stereoscopic properties may be obtained with said camera mounted on said device by merely making an exposure while the camera is in one of said operative positions and making a second exposure after said arm and camera have been moved to the other of said operative positions.

4. A camera supporting device for stereoscopic photography, said supporting device comprising a relatively fixed base, a movable member having an elongated body portion and a cylindrical portion extending angularly therefrom, said cylindrical end portion being hingedly secured in a bore in said base for upward pivotal movement of said body portion about a longitudinally disposed axis, a short projection fixedly carried by said cylindrical portion so as to move therewith, abutment means carried by said base and disposed in such positions relative to said short projection as to support said elongated body portion of said member in substantially laterally extending positions at either side of said base and substantially 180° apart, said abutment means normally preventing movement of said member when at either side of said base downwardly beyond either of said laterally extending positions, bracket means carried by said body portion at a location spaced an appreciable amount from said cylindrical portion, and attachable camera supporting means carried by said bracket means so as to support a camera with its optical axis disposed at an acute angle relative to said longitudinally disposed axis when in operative positions at either side of said base, the construction and arrangement of the device being such that said optical axis in both operative positions of said camera and said longitudinally disposed axis jointly lying substantially in a common plane, whereby a pair of photographic exposures having stereoscopic properties may be obtained with said camera mounted on said device by merely making an exposure while the camera is in one of said operative positions and making a second exposure after said camera and said movable member have been moved to the other of said operative positions.

5. A camera supporting device for stereoscopic photography, said supporting device comprising a relatively fixed base, an elongated movable arm, means hingedly securing one end portion of said arm to said base for upward pivotal movement about a longitudinally disposed axis, abutment means carried by said base and disposed in such positions relative to said arm and said hinge means as to support the opposite free end portion of said arm in a substantially laterally extending position at either side of said base, said abutment means normally preventing movement of said arm when at either side of said base downwardly beyond either of said laterally extending positions, and bracket means carried by said arm at a location spaced from the hinged end portion thereof and constructed and arranged to support a camera with its optical axis disposed at an angle relative to said longitudinally disposed axis when in operative positions at either side of said base, sighting means on said base adjacent said longitudinally disposed axis and arranged so as to have its line of sight extend substantially along said longitudinal axis, the construction and arrangement of the device being such that said optical axis in both operative positions of said camera and said longitudinally disposed axis jointly lying substantially in a common plane, whereby a pair of photographic exposures having stereoscopic properties may be obtained with said camera mounted on said device by merely making an exposure while the camera is in one of said operative positions and making a second exposure after said arm and camera have been moved to the other of said operative positions.

RICHARD S. ROBINS.

References Cited in the file of this patent
UNITED STATES PATENTS

| Number | Name | Date |
|---|---|---|
| 713,177 | Thomsen | Nov. 11, 1902 |
| 2,326,657 | Johnston | Aug. 10, 1943 |